United States Patent
Rao et al.

(10) Patent No.: US 9,853,881 B2
(45) Date of Patent: Dec. 26, 2017

(54) AUTONOMOUS SYSTEM BORDER ROUTER (ASBR) ADVERTISING ROUTES WITH A SAME FORWARDING LABEL

(71) Applicants: Dhananjaya Rao, San Jose, CA (US); Keyur Patel, San Jose, CA (US)

(72) Inventors: Dhananjaya Rao, San Jose, CA (US); Keyur Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 63 days.

(21) Appl. No.: 14/263,738

(22) Filed: Apr. 28, 2014

(65) Prior Publication Data

US 2015/0312133 A1 Oct. 29, 2015

(51) Int. Cl.
| | |
|---|---|
| H04L 12/715 | (2013.01) |
| H04L 12/723 | (2013.01) |
| H04L 12/46 | (2006.01) |
| H04L 12/751 | (2013.01) |

(52) U.S. Cl.
CPC ........ H04L 45/04 (2013.01); *H04L 12/4641* (2013.01); *H04L 45/02* (2013.01); *H04L 45/50* (2013.01)

(58) Field of Classification Search
CPC ..... H04L 45/04; H04L 12/4641; H04L 45/50; H04L 45/54; H04L 41/12
See application file for complete search history.

(56) References Cited

U.S. PATENT DOCUMENTS

| | | | |
|---|---|---|---|
| 2002/0110119 A1* | 8/2002 | Fredette | H04Q 11/0478 370/389 |
| 2006/0133265 A1* | 6/2006 | Lee | H04L 12/4641 370/228 |
| 2010/0008220 A1 | 1/2010 | Le Roux et al. | |

(Continued)

OTHER PUBLICATIONS

Hawkinson and Bates, "Guidelines for creation, selection, and registration of an Autonomous System (AS)," RFC 1930, Mar. 1996, The Internet Society, Reston, VA (ten pages).

(Continued)

*Primary Examiner* — Ricky Ngo
*Assistant Examiner* — Stephen Steiner
(74) *Attorney, Agent, or Firm* — The Law Office of Kirk D. Williams (57) ABSTRACT

In one embodiment, an autonomous system border router (ASBR) advertises a same forwarding label for received advertised routes of a merging context that were advertised with a same forwarding label for the ASBR to use when sending corresponding packets. An ASBR receives via a routing protocol from a particular router in the same autonomous system, a plurality of same-labeled received routes advertised with a same first forwarding label within a merging context. In response to each of the plurality of same-labeled received routes having the same first forwarding label to use to forward packets to the particular router and being in the same merging context, the ASBR determines a merged forwarding label and advertises to a peer ASBR in another autonomous system (AS) each of the plurality of same-labeled received routes with the merged forwarding label for the peer ASBR to use to forward packets to the ASBR.

20 Claims, 5 Drawing Sheets

(56) References Cited

U.S. PATENT DOCUMENTS

2011/0080911 A1    4/2011  Guichard et al.
2012/0027013 A1*  2/2012  Napierala ............... H04L 45/04
                                                                          370/390

OTHER PUBLICATIONS

"MPLS VPN Inter-AS with ASBRs Exchanging IPv4 Routes and MPLS Labels," MPLS Layer 3 VPNs Inter-AS and CSC Configuration Guide, Cisco IOS XE Release 3S (Cisco ASR 1000), Mar. 29, 2013, Cisco Systems, Inc., San Jose, CA (thirty-six pages).
"BGP NSR Support for MPLS VPNv4 and VPNv6 Inter-AS Option B," IP Routing: BGP Configuration Guide, Cisco IOS Release 15S, Oct. 15, 2013, Cisco Systems, Inc., San Jose, CA (eight pages).

* cited by examiner

AUTONOMOUS SYSTEM BORDER ROUTER (ASBR) ADVERTISING ROUTES WITH A SAME FORWARDING LABEL

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Border Gateway Protocol (BGP) is a routing protocol of the Internet that maintains a table of IP addresses (i.e., prefixes) which designate network reachability among autonomous systems (AS's). As used herein, an AS is a connected group of one or more IP prefixes run by one or more network operators which has a single and clearly defined routing policy. As used herein, the term "BGP" refers to all forms of BGP, including internal-BGP and external-BGP. Each BGP advertised route must be unique, otherwise, a subsequent advertisement of the route will consider it the same, and overwrite any previous information received about the route. BGP extensions advertise routes for a Virtual Private Network (VPN). A VPN-IPv4 address is a 12-byte string, beginning with an 8-byte Route Distinguisher (RD) and ending with a 4-byte IPv4 address. If several VPNs use the same IPv4 address prefix, these will be translated into unique VPN-IPv4 address prefixes, making it possible for BGP to carry several completely different routes to that IP address.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with an autonomous system border router (ASBR) advertising a same forwarding label for received advertised routes of a merging context that were advertised with a same forwarding label for the ASBR to use when sending corresponding packets. In one embodiment, a merging context refers to all received advertised routes, routes of a particular VLAN, routes advertised by a particular customer edge router, routes of a particular Virtual Routing and Forwarding (VRF) data structure, and/or routes of some other subset. In one embodiment, the routes are IPv4 and/or IPv6 routes.

One embodiment includes a method or a device (e.g., a router) performing operations, comprising: receiving, via a routing protocol by an autonomous system border router (ASBR) from a particular router in the same autonomous system, a plurality of same-labeled received routes advertised with a same first forwarding label within a merging context; and in response to each of the plurality of same-labeled received routes having the same first forwarding label to use to forward packets to the particular router and being in the same merging context, the ASBR determining a merged forwarding label and advertising to a peer ASBR in another autonomous system (AS) each of the plurality of same-labeled received routes with the merged forwarding label for the peer ASBR to use to forward packets to the ASBR.

One embodiment includes a method or a device (e.g., a router) performing operations, comprising: receiving, via a routing protocol by an autonomous system border router (ASBR) from a particular router in the same autonomous system, a plurality of same-labeled received routes advertised with a same merging group identifier; and in response to each of the plurality of same-labeled received routes having the same merging group identifier, the ASBR determining a merged forwarding label and advertising to a peer ASBR in another autonomous system (AS) each of the plurality of same-labeled received routes with the merged forwarding label for the peer ASBR to use to forward packets to the ASBR.

In one embodiment, a method or operations performed by a device (e.g., a router) include: receiving, via the routing protocol by the ASBR from the particular router, a plurality of received different forwarding-labeled advertised routes each with a different forwarding label; and for each particular received different forwarding-labeled advertised route of the plurality of received different forwarding-labeled advertised routes, the ASBR determining a different second forwarding label and advertising via a routing protocol said particular received different forwarding-labeled advertised route being associated with the different second forwarding label, with each of said second forwarding labels and the merged forwarding label being different.

2. Description

Disclosed are, inter alia, methods, apparatus, computer-storage media, mechanisms, and means associated with an autonomous system border router (ASBR) advertising a same forwarding label for received advertised routes of a merging context that were advertised with a same forwarding label for the ASBR to use when sending corresponding packets. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first" "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Figure 1:
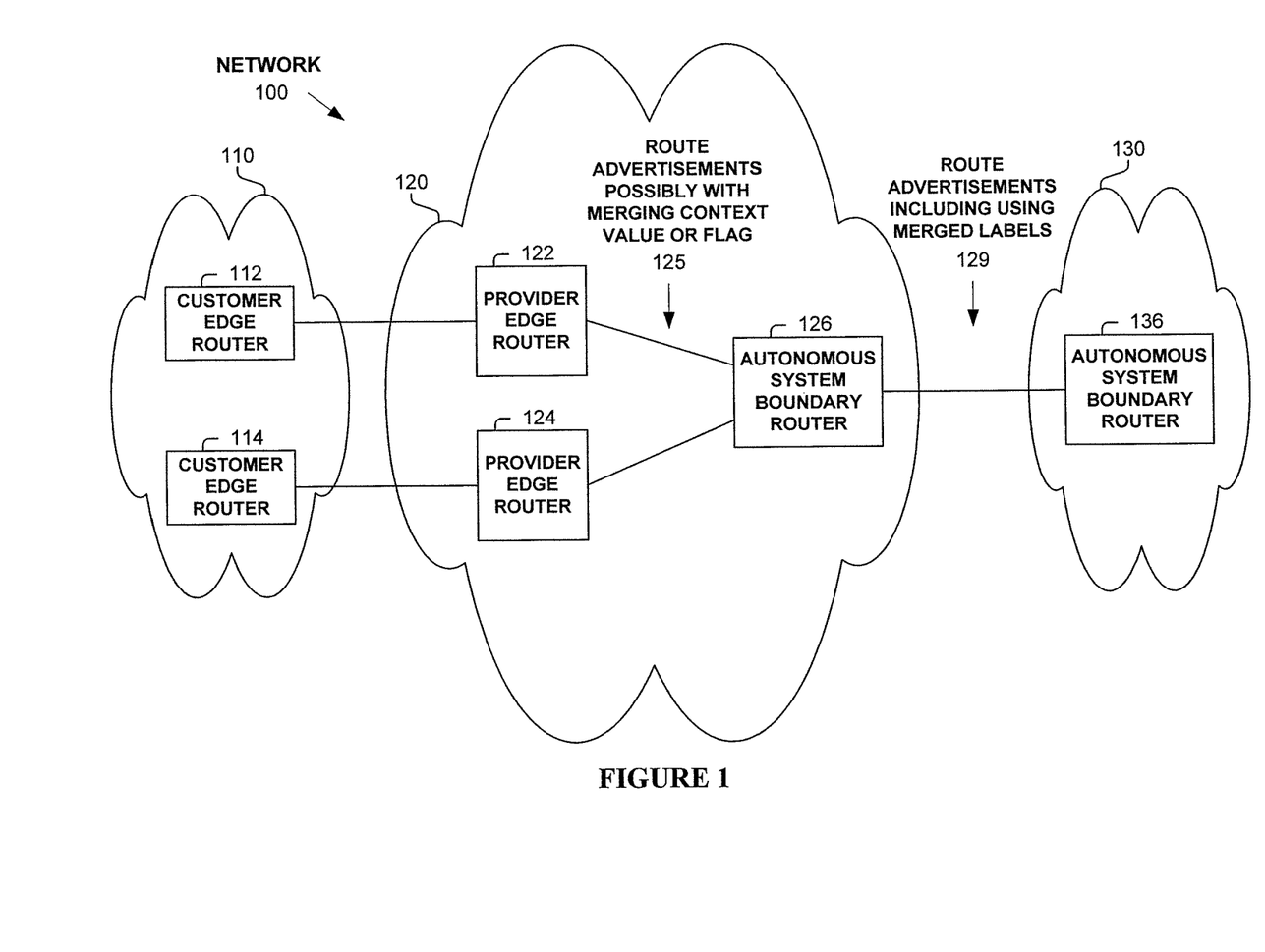
FIG. 1 illustrates a network operating according to one embodiment.

FIG. 1 illustrates a network 100 operating according to one embodiment. Shown are customer network 110, autonomous system (AS) network 120, and AS network 130. Customer network 110 includes two customer edge routers 112 and 114 communicatively coupled to provider edge routers 122 and 124, respectively, of network 120. Autonomous system boundary router (ASBR) 126 of AS network 120 is communicatively coupled to ASBR 136 of AS network 130.

Routing protocols typically advertise routes (e.g., prefixes) routing information associated therewith (e.g., nexthop, a forwarding label). A conventional ASBR receiving the advertised route typically allocates a forwarding label not used by another route and advertises this route with a new forwarding label. Therefore, the number of labels typically used by a conventional ASBR in regards to a peer ASBR is on the order of the number of routes advertised.

In one embodiment, ASBR 126 receives, via a routing protocol from a particular router (122 or 124) in the same autonomous system, a plurality of routes advertised (125) with a same first forwarding label within a merging context. In response to each of the plurality of received advertised routes having the same first forwarding label to use to forward packets to the particular router and being in the same merging context, ASBR 126 determines a merged forwarding label and advertises (129) to peer ASBR 136 in another AS (130) each of the plurality of received advertised routes having the same first forwarding label and in the same merging context with the merged forwarding label for peer ASBR 136 to use to forward corresponding packets to ASBR 126. The term "merged forwarding label" is used to refer to a forwarding label selected by any method that is shared within a merging context (e.g., in this one embodiment by each of the same-labeled received routes). In one embodiment, a particular merging contexts equates to a forwarding equivalency class (FEC) of the advertising router. Therefore, the merged forwarding label can be used as ASBR 126 does not need to keep the route advertisements independent by advertising each of them with a different forwarding label. In one embodiment, ASBR 126 determines that the advertised routes are in the same merging context based on a same Border Gateway Protocol (BGP) next-hop (e.g., the route has a same <label, next-hop> tuple as other advertised routes so they can be advertised with a same merged forwarding label). In one embodiment, ASBR 126 determines the same merging context based on a same <export route target (RT), next-hop> tuple.

In one embodiment, ASBR 126 receives, via a routing protocol from a particular router (122 or 124) in the same autonomous system, a plurality of routes advertised (125) with a same merging group identifier (e.g., an attribute assigned by router 122 or 124 in the advertisement signaling a particular merging group). In one embodiment, in response to each of the plurality of received routes having the same merging group identifier, ASBR 126 determines a merged forwarding label and advertises to peer ASBR 136 in another AS (130) each of the plurality of received routes with the merged forwarding label for peer ASBR 136 to use to forward corresponding packets to ASBR 126 (and ASBR 126 will use a label associated with one of the advertisements to forward corresponding packets to the particular router (122 or 124) in the same autonomous system). In one embodiment, each of these routes includes a same forwarding label to use in sending to the advertising router. In one embodiment, in response to each of the plurality of same-labeled received routes having the same merging group identifier, ASBR 126 determines a merged forwarding label and advertises to peer ASBR 136 in another AS (130) each of the plurality of same-labeled received routes with the merged forwarding label for peer ASBR 136 to use to forward corresponding packets to ASBR 126 (and ASBR 126 will use the same label associated with each of the advertisements to forward corresponding packets to the particular router (122 or 124) in the same autonomous system).

In one embodiment, ASBR 126 receives (125), via a routing protocol from a particular router (122 or 124) in the same autonomous system, a plurality of received different forwarding-labeled advertised routes each with a different forwarding label. For each particular received different forwarding-labeled advertised route of the plurality of received different forwarding-labeled advertised routes, ASBR 126 determines a different second forwarding label and advertises (129) via a routing protocol said particular received different forwarding-labeled advertised route being associated with the different second forwarding label for peer ASBR 136 to use to forward corresponding packets to ASBR 126, with each of said second forwarding labels and the merged forwarding label being different.

In one embodiment, ASBR 126 identifies that each of the plurality of same-labeled received routes are in the merging context based on said advertisement (125) associating each of the plurality of same-labeled received routes with a particular merged-label attribute identifying that they are part of a same merging context (e.g., an attribute assigned by router 122 or 124 in the advertisement signaling a particular merging group). Although this particular technique is described for determining that multiple same-labeled received routes are in a same merging context, this disclosure contemplates determining that multiple same-labeled received routes are in the same merging context in any suitable manner. In one embodiment, said advertisement (125) of each route of the plurality of same-labeled received routes associates each of the plurality of same-labeled received routes with a merging flag that identifies that said route is a candidate for merging. One embodiment includes ASBR 126 identifying that each of the plurality of same-labeled received routes are in the merging context based on their having a same Border Gateway Protocol (BGP) next-hop. In one embodiment, the merging context includes each of the plurality of same-labeled received routes advertised being within a same virtual private network (VPN). In one embodiment, each of the plurality of same-labeled received routes advertised is a VPN Internet Protocol version 4 (VPN-IPv4) route.

Figure 2:
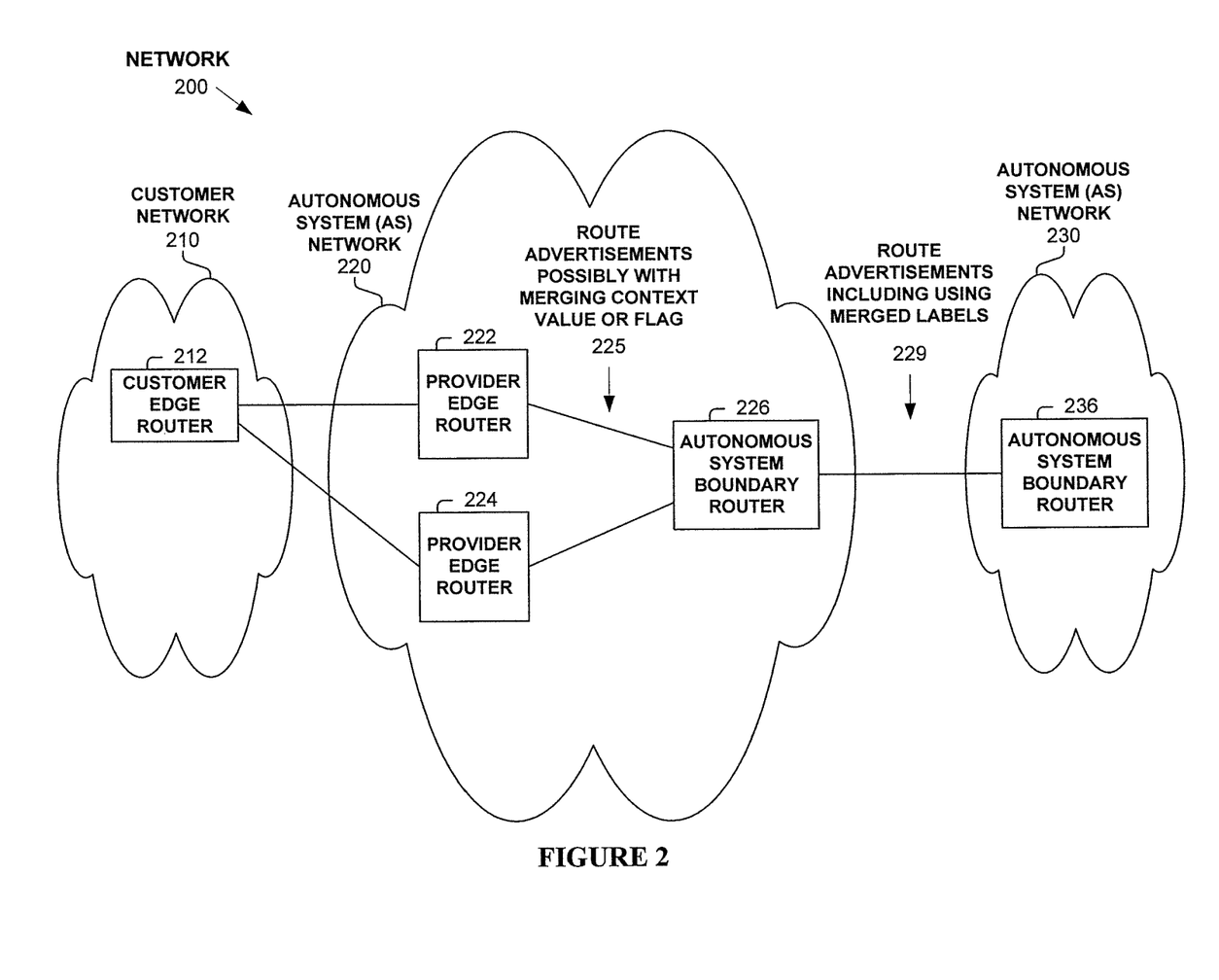
FIG. 2 illustrates a network operating according to one embodiment.

FIG. 2 illustrates a network 200 operating according to one embodiment. Shown are customer network 210, autonomous system (AS) network 220, and AS network 230. Customer network 210 includes a customer edge router 212 dual-homed, communicatively coupled to each of provider edge routers 222 and 224 of network 220. Autonomous system boundary router (ASBR) 226 of AS network 120 is communicatively coupled to ASBR 236 of AS network 230.

One embodiment includes ASBR 226 receiving, via a routing protocol from both first particular router 222 and second particular router 224 in the same autonomous system 220, a plurality of additional same-labeled received routes advertised (225) with a same first forwarding label within the merging context. In one embodiment, ASBR 226 ignores a route discriminator of these advertised routes when they are in the same merging context. In response to each of the plurality of same-labeled received routes having the same first forwarding label to use to forward packets to the particular router and being in the same merging context, ASBR 226 determines a merged forwarding label and advertising to peer ASBR 236 in another autonomous system 230 each of the plurality of same-labeled received routes with the merged forwarding label for peer ASBR 236 to use to forward packets to ASBR 226.

Figure 3A:
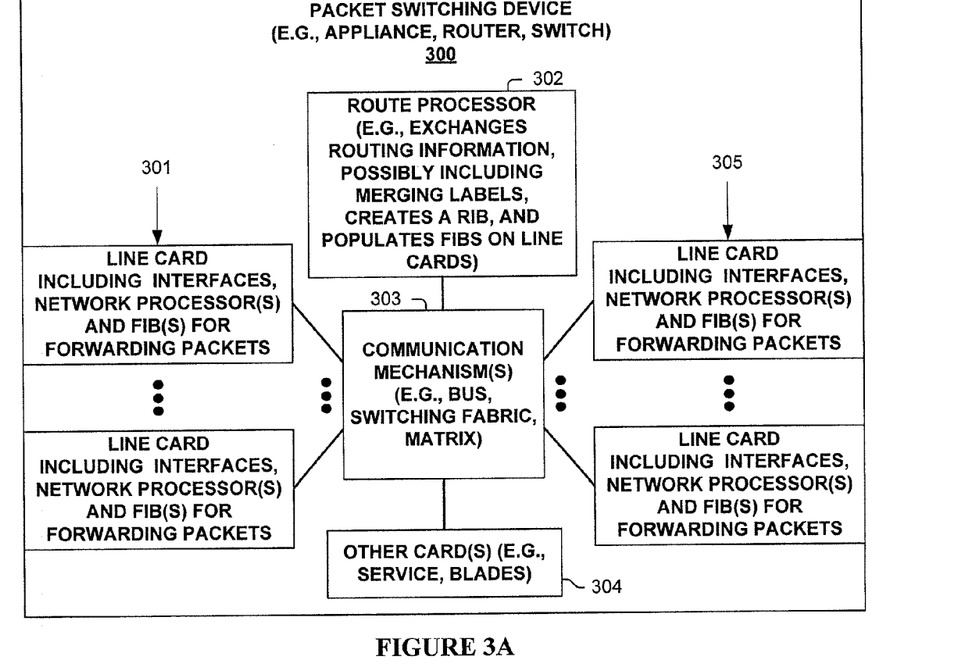
FIG. 3A illustrates a packet switching device according to one embodiment.

One embodiment of a packet switching device 300 (e.g., router) is illustrated in FIG. 3A. As shown, packet switching device 300 includes multiple line cards 301 and 305, each with one or more network interfaces for sending and receiving packets over communications links (e.g., possibly part of a link aggregation group), and with one or more processing elements that are used in one embodiment associated with an autonomous system border router (ASBR) advertising a same forwarding label for received advertised routes of a merging context that were advertised with a same forwarding label for the ASBR to use when sending corresponding packets. Packet switching device 300 also has a control plane with one or more processing elements 302 for managing the control plane and/or control plane processing of packets associated with an autonomous system border router (ASBR) advertising a same forwarding label for received advertised routes of a merging context that were advertised with a same forwarding label for the ASBR to use when sending corresponding packets. Packet switching device 300 also includes other cards 304 (e.g., service cards, blades) which include processing elements that are used in one embodiment to process packets associated with an autonomous system border router (ASBR) advertising a same forwarding label for received advertised routes of a merging context that were advertised with a same forwarding label for the ASBR to use when sending corresponding packets, and some communication mechanism 303 (e.g., bus, switching fabric, matrix) for allowing its different entities 301, 302, 304 and 305 to communicate.

Line cards 301 and 305 typically perform the actions of being both an ingress and egress line card, in regards to multiple other particular packets and/or packet streams being received by, or sent from, packet switching device 300. In one embodiment, line cards 301 and/or 305 perform synchronization processing for packets of a packet stream corresponding to the synchronization label received in a packet. In one embodiment, a synchronization label refers to one or more labels in a label stack of a packet.

Figure 3B:
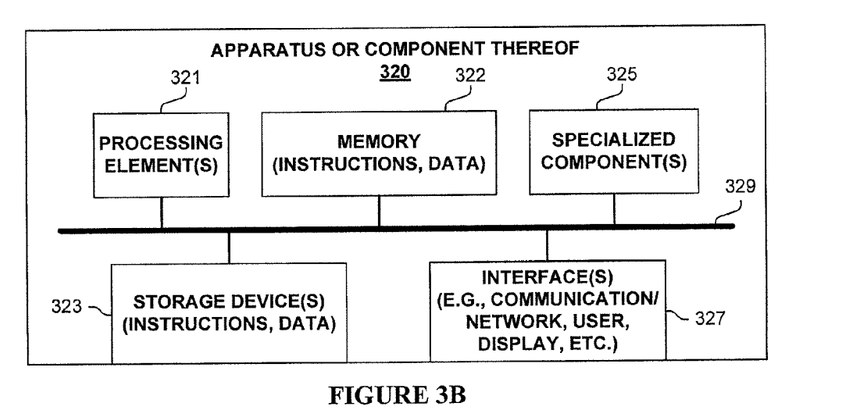
FIG. 3B illustrates an apparatus according to one embodiment.

FIG. 3B is a block diagram of an apparatus 320 used in one embodiment associated with an autonomous system border router (ASBR) advertising a same forwarding label for received advertised routes of a merging context that were advertised with a same forwarding label for the ASBR to use when sending corresponding packets. In one embodiment, apparatus 320 performs one or more processes (which may include synchronization processing), or portions thereof, corresponding to one of the flow diagrams illustrated or otherwise described herein, and/or illustrated in another diagram or otherwise described herein.

In one embodiment, apparatus 320 includes one or more processing element(s) 321, memory 322, storage device(s) 323, specialized component(s) 325 (e.g. optimized hardware such as for performing lookup and/or packet processing operations, etc.), and interface(s) 327 for communicating information (e.g., sending and receiving packets, user-interfaces, displaying information, etc.), which are typically communicatively coupled via one or more communications mechanisms 329, with the communications paths typically tailored to meet the needs of a particular application.

Various embodiments of apparatus 320 may include more or fewer elements. The operation of apparatus 320 is typically controlled by processing element(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processing element(s) 321 and/or data which is manipulated by processing element(s) 321 for implementing functionality in accordance with an embodiment. Storage device(s) 323 are another type of computer-readable medium, and typically comprise solid state storage media, disk drives, diskettes, networked services, tape drives, and other storage devices. Storage device (s) 323 typically store computer-executable instructions to be executed by processing element(s) 321 and/or data which is manipulated by processing element(s) 321 for implementing functionality in accordance with an embodiment.

Figure 4:
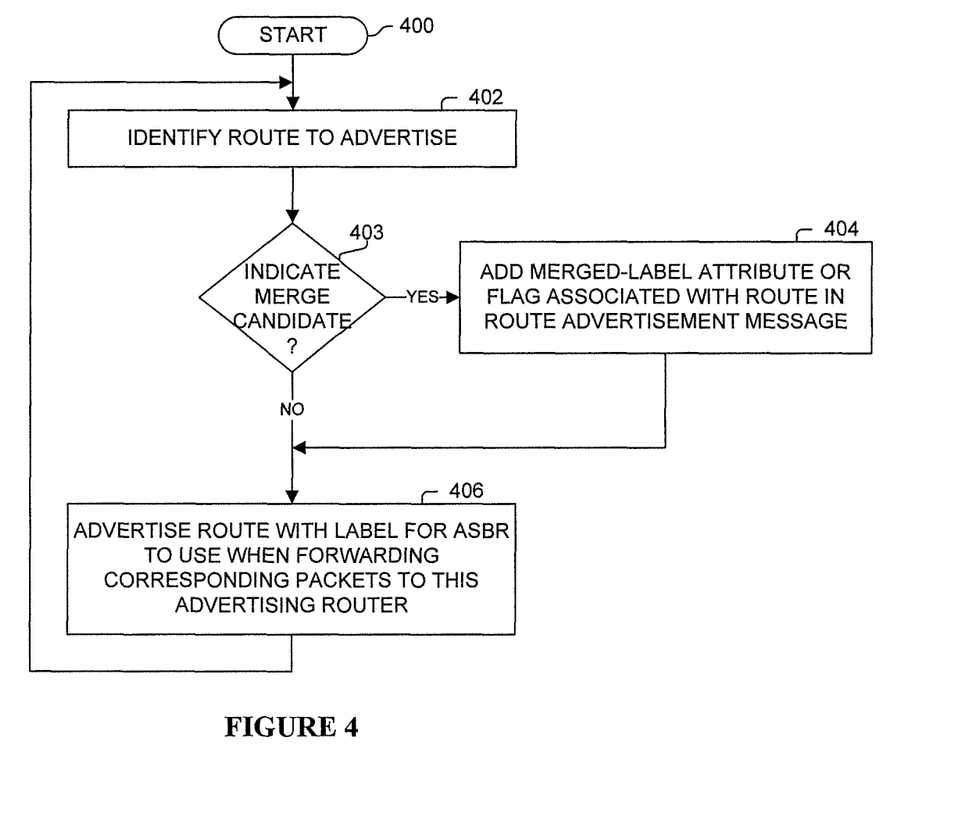
FIG. 4 illustrates a process according to one embodiment.

FIG. 4 illustrates a process performed in one embodiment, such as by, but not limited to, a provider edge router. Processing begins with process block 400. In process block 402, the router identifies a route to advertise. In process block 403, a determination is made whether to indicate to the ASBR that the route is a merge candidate. This determination is typically made based on configuration of the ASBR, such as, but not limited to, whether advertised routes of associated with a particular FEC can be merged. Also, by advertising to ASBR that a route is or is not a merge candidate, processing by the ASBR to make the determination of whether the route is or is not a merge candidate may be reduced, but requires extra processing by the one embodiment to make this determination prior to advertising of the route. If the determination in process block 403 is to indicate to the ASBR that the route is a merge candidate, then processing proceeds to process block 404. If the determination in process block 403 is not to indicate to the ASBR that the route is a merge candidate, then processing proceeds directly to process block 406.

In process block 404, one embodiment associates with a route a merged-label attribute identifying a particular merging context (e.g., identifying to the ASBR a route of a set of routes associated with the particular merging context, possibly belonging to a same FEC, that can use a same forwarding label when sending to the one embodiment, and hence, can advertise to another ASBR using a same forwarding label) or a merge flag (e.g., signaling that this route is a candidate for merging by the ASBR but does not identify a particular merging context).

One embodiment determines the merged-label attribute identifying a particular merging context by performing the processing, such as that described herein, to determine that the ASBR can use the same merging label when sending to the one embodiment (and hence, can advertise to another ASBR using a same forwarding label) all routes advertised with the same merged-label attribute. In one embodiment, an ASBR determines that routes advertised by a same router with a same forwarding label are in the same merging context based on a same Border Gateway Protocol (BGP) next-hop (e.g., the route has a same <label, next-hop> tuple as other advertised routes so they can be advertised with a same merged forwarding label). In one embodiment, an ASBR determines that routes advertised by a same router with a same forwarding label are in the same merging context based on a same <export route target (RT), next-hop> tuple. Providing this merged-label attribute reduces or eliminates processing by the ASBR as it can map a same merging label with the same merged-label attribute. One embodiment signaling to the ASBR that this route is a candidate for merging by the ASBR requires that the ASBR must still do processing to map advertised routes to a merged forwarding label, but the ASBR can limit this processing to only those routes advertised as a candidate for merging by the ASBR. Processing proceeds to process block 406.

In process block 406, the route is advertised to the ASBR with a label for the ASBR to use when forwarding corresponding packets to this advertising router (e.g., provider edge router). Processing returns to process block 402.

Figure 5:
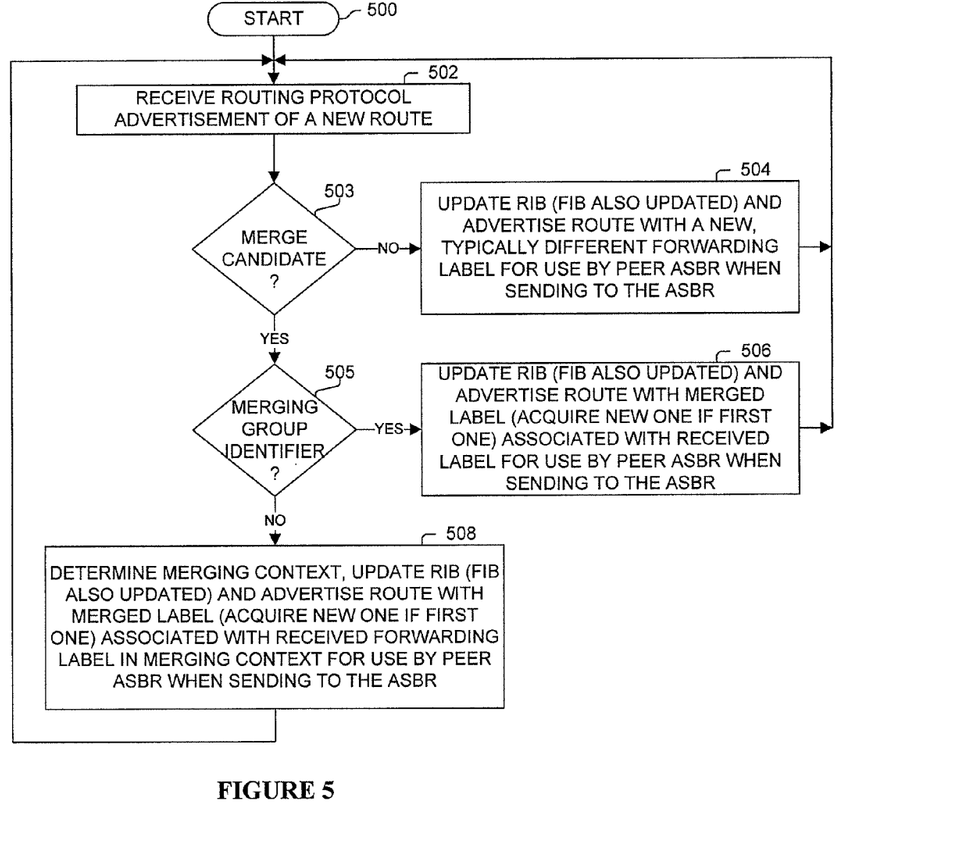
FIG. 5 illustrates a process according to one embodiment.

FIG. 5 illustrates a process performed in one embodiment, such as, but not limited to, by an ASBR. Processing begins with process block 500. In process block 502, the ASBR receives a routing protocol advertisement of a new route. In certain embodiments, re-advertising and withdrawal of routes is performed in a normal manner adapted to conform with the teachings herein.

In process block 503, if this advertised route is a candidate for merging, then a determination is made to proceed to process block 505; otherwise to process block 504. This determination may include, but is not limited to, determining whether the route advertisement includes an attribute of a merging flag or merging group identifier label, configuration information identifying some subset of advertised routes (e.g., of a particular VLAN), or possibly all advertised routes should be considered by the ASBR as a merging candidate. This determination is typically made based on configuration information to identify whether the one embodiment should perform the processing related to merged forwarding labels, rather than simply conventionally use a different label for each advertised route.

In process block 504, the routing information base (RIB) of the ASBR is updated and the route is advertised typically with a new, locally assigned, forwarding label for use by the peer ASBR in sending corresponding packets to the ASBR. The forwarding information base (FIB) will be updated in due course to add the label forwarding information to the forwarding plane of the ASBR (e.g., line cards are updated). Processing returns to process block 502.

As determined in process block 505, if the received advertisement of the route includes a merging group identifier, then process block 506 is performed; otherwise process block 508 is performed.

In process block 506, if the ASBR has not already associated a particular merged forwarding label with the particular merging group identifier, then the particular merged forwarding label is determined (e.g., an unused forwarding label is selected in some manner) and associated with the merging group identifier. The routing information base (RIB) of the ASBR is updated with the mapping between the particular merging group identifier and the particular merged forwarding label. The forwarding information base (FIB) will be updated in due course to add the particular merged label forwarding information to the forwarding plane of the ASBR. In one embodiment, the ASBR maintains a mapping between the particular merged forwarding label and the received forwarding label. In one embodiment, one or more FIBs are updated with this mapping such that a packet received with the particular merged forwarding label can efficiently packet switched to a packet with the received forwarding label and sent from the ASBR. The route is advertised with the particular merged forwarding label for use by the peer ASBR in sending corresponding packets to the ASBR. Processing returns to process block 502.

In process block 508, the ASBR determines the merging context itself, as the advertising router did not provide this information and the ASBR is configured to perform merging processing as determined in process block 503. In one embodiment, this processing includes, but is not limited to, determining a forwarding context based on a same <label, next-hop> tuple, same <export RT, next-hop> tuple, or some other mechanism which equates to forwarding to a same router with a same label. Note, the ASBR may determine that only a single particular advertised route is in a particular merging context as no other advertised route satisfies this criteria with the particular advertised route.

If the ASBR has not already associated a particular merged forwarding label with the determined particular merging context, then the particular merged forwarding label is determined (e.g., an unused forwarding label is selected in some manner) and associated with the determined particular merging context. The routing information base (RIB) of the ASBR is updated with the mapping between the determined particular merging context and the particular merged forwarding label. The forwarding information base (FIB) will be updated in due course to add the particular merged label forwarding information to the forwarding plane of the ASBR. In one embodiment, the ASBR maintains a mapping between the particular merged forwarding label and the received forwarding label. In one embodiment, one or more FIBs are updated with this mapping such that a packet received with the particular merged forwarding label can efficiently packet switched to a packet with the received forwarding label and sent from the ASBR. The route is advertised with the particular merged forwarding label for use by the peer ASBR in sending corresponding packets to the ASBR. Processing returns to process block 502.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
receiving, via a routing protocol by a first autonomous system border router (ASBR) from a particular router in the same autonomous system, a plurality of same-labeled received routes advertised with a same first forwarding label within a merging context; and
in response to each of the plurality of same-labeled received routes having the same first forwarding label to use to forward packets to the particular router and being in the same merging context, the first ASBR determines a merged forwarding label and advertises to a peer ASBR in another autonomous system (AS) each of the plurality of same-labeled received routes with the merged forwarding label for the peer ASBR to use to forward packets to the first ASBR, with said advertising each of the plurality of same-labeled received routes with the merged forwarding label meaning that the value of each route of the plurality of same-labeled received route is advertised with the merged forwarding label to the peer ASBR.

2. The method of claim 1, comprising:
receiving, via the routing protocol by the first ASBR from the particular router, a plurality of received different forwarding-labeled advertised routes each with a different forwarding label; and
for each particular received different forwarding-labeled advertised route of the plurality of received different forwarding-labeled advertised routes, the first ASBR determining a different second forwarding label and advertising via a routing protocol said particular received different forwarding-labeled advertised route being associated with the different second forwarding label, with each of said second forwarding labels and the merged forwarding label being different.

3. The method of claim 2, comprising: the first ASBR identifying that each of the plurality of same-labeled received routes are in the merging context based on said advertisement associating each of the plurality of same-labeled received routes with a particular merged-label attribute identifying that they are part of a same merging context.

4. The method of claim 2, wherein said advertisement of each route of the plurality of same-labeled received routes associates each of the plurality of same-labeled received routes with a merging flag that identifies that said route is a candidate for merging.

5. The method of claim 2, comprising: the first ASBR identifying that each of the plurality of same-labeled received routes are in the merging context based on their having a same Border Gateway Protocol (BGP) next-hop or a same export route target (RT).

6. The method of claim 2, wherein the merging context includes each of the plurality of same-labeled received routes advertised being within a same virtual private network (VPN).

7. The method of claim 6, wherein each of the plurality of same-labeled received routes advertised is a VPN Internet Protocol version 4 (VPN-IPv4) route.

8. The method of claim 2, comprising:
receiving, via a routing protocol by the first ASBR from a second particular router in the same autonomous system, a plurality of additional same-labeled received routes advertised with a same first forwarding label within the merging context; and
in response to each of the plurality of same-labeled received routes having the same first forwarding label to use to forward packets to the particular router and being in the same merging context, the first ASBR determining a merged forwarding label and advertising to a peer ASBR in another autonomous system (AS) each of the plurality of same-labeled received routes with the merged forwarding label for the peer ASBR to use to forward packets to the first ASBR.

9. The method of claim 1, comprising: the first ASBR identifying that each of the plurality of same-labeled received routes are in the merging context based on said advertisement associating each of the plurality of same-labeled received routes with a particular merged-label attribute identifying that they are part of a same merging context.

10. The method of claim 1, wherein said advertisement of each route of the plurality of same-labeled received routes associates each of the plurality of same-labeled received routes with a merging flag that identifies that said route is a candidate for merging.

11. The method of claim 1, comprising:
receiving, via a routing protocol by the first ASBR from a second particular router in the same autonomous system, a plurality of additional same-labeled received routes advertised with a same first forwarding label within the merging context; and
in response to each of the plurality of same-labeled received routes having the same first forwarding label to use to forward packets to the particular router and being in the same merging context, the first ASBR determining a merged forwarding label and advertising to a peer ASBR in another autonomous system (AS) each of the plurality of same-labeled received routes with the merged forwarding label for the peer ASBR to use to forward packets to the first ASBR.

12. A method, comprising:

receiving, via a routing protocol by a first autonomous system border router (ASBR) from a particular router in the same autonomous system, a plurality of same-labeled received routes advertised with a same merging group identifier; and in response to each of the plurality of same-labeled received routes having the same merging group identifier, the first ASBR determining a merged forwarding label and advertising to a peer ASBR in another autonomous system (AS) each of the plurality of same-labeled received routes with the merged forwarding label for the peer ASBR to use to forward packets to the first ASBR, with said advertising each of the plurality of same-labeled received routes with the merged forwarding label meaning that the value of each route of the plurality of same-labeled received route is advertised with the merged forwarding label to the peer ASBR.

13. The method of claim 12, comprising:

receiving, via the routing protocol by the first ASBR from the particular router, a plurality of received different forwarding-labeled advertised routes each with a different forwarding label; and for each particular received different forwarding-labeled advertised route of the plurality of received different forwarding-labeled advertised routes, the first ASBR determining a different second forwarding label and advertising via a routing protocol said particular received different forwarding-labeled advertised route being associated with the different second forwarding label, with each of said second forwarding labels and the merged forwarding label being different.

14. A first autonomous system border router (ASBR), comprising:

one or more processing elements;

memory;

a plurality of interfaces that send and receive packets; and one or more packet switching mechanisms that packet switch packets among said interfaces;

wherein the first ASBR performs operations, including:

receiving, via a routing protocol by an autonomous system border router (ASBR) from a particular router in the same autonomous system, a plurality of same-labeled received routes advertised with a same first forwarding label within a merging context; and in response to each of the plurality of same-labeled received routes having the same first forwarding label to use to forward packets to the particular router and being in the same merging context, the first ASBR determining a merged forwarding label and advertising to a peer ASBR in another autonomous system (AS) each of the plurality of same-labeled received routes with the merged forwarding label for the peer ASBR to use to forward packets to the first ASBR, with said advertising each of the plurality of same-labeled received routes with the merged forwarding label meaning that the value of each route of the plurality of same-labeled received route is advertised with the merged forwarding label to the peer ASBR.

15. The first ASBR of claim 14, wherein said operations comprise:

receiving, via the routing protocol by the first ASBR from the particular router, a plurality of received different forwarding-labeled advertised routes each with a different forwarding label; and for each particular received different forwarding-labeled advertised route of the plurality of received different forwarding-labeled advertised routes, the first ASBR determining a different second forwarding label and advertising via a routing protocol said particular received different forwarding-labeled advertised route being associated with the different second forwarding label, with each of said second forwarding labels and the merged forwarding label being different.

16. The first ASBR of claim 14, wherein said operations comprise: the first ASBR identifying that each of the plurality of same-labeled received routes are in the merging context based on said advertisement associating each of the plurality of same-labeled received routes with a particular merged-label attribute identifying that they are part of a same merging context.

17. The first ASBR of claim 14, wherein said advertisement of each route of the plurality of same-labeled received routes associates each of the plurality of same-labeled received routes with a merging flag that identifies that said route is a candidate for merging.

18. The first ASBR of claim 14, wherein said operations comprise: the first ASBR identifying that each of the plurality of same-labeled received routes are in the merging context based on their having a same Border Gateway Protocol (BGP) next-hop.

19. The first ASBR of claim 14, wherein the merging context includes each of the plurality of same-labeled received routes advertised being within a same virtual private network (VPN); and wherein each of the plurality of same-labeled received routes advertised is a VPN Internet Protocol version 4 (VPN-IPv4) route.

20. The first ASBR of claim 14, wherein said operations comprise:

receiving, via a routing protocol by the first ASBR from a second particular router in the same autonomous system, a plurality of additional same-labeled received routes advertised with a same first forwarding label within the merging context; and in response to each of the plurality of same-labeled received routes having the same first forwarding label to use to forward packets to the particular router and being in the same merging context, the first ASBR determining a merged forwarding label and advertising to a peer ASBR in another autonomous system (AS) each of the plurality of same-labeled received routes with the merged forwarding label for the peer ASBR to use to forward packets to the first ASBR.

* * * * *